(Model.)
5 Sheets—Sheet 1.
B. B. HOTCHKISS.
TORPEDO BOAT.
No. 278,708. Patented June 5, 1883.
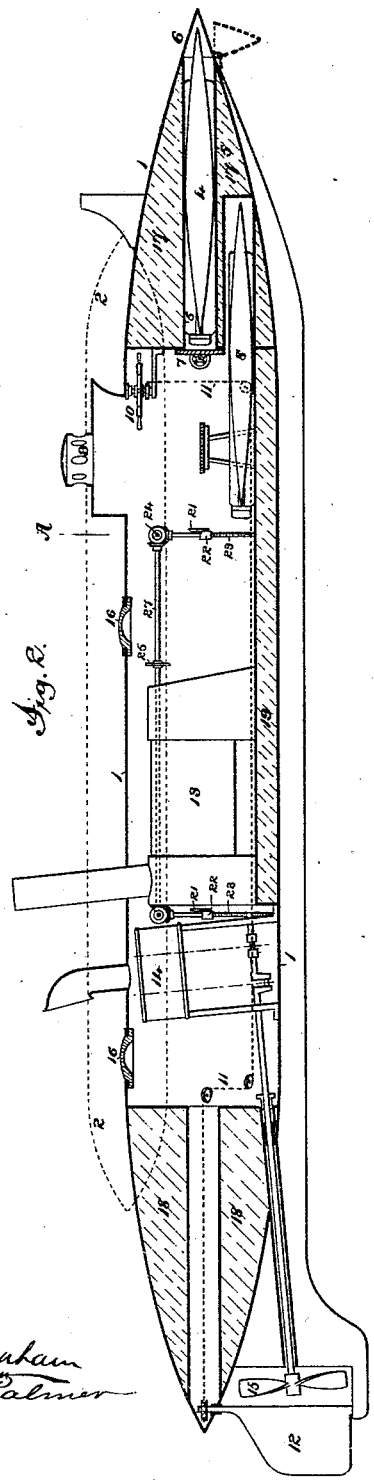
Attest,
Geo. M. Graham
T. H. Palmer
Inventor
B. B. Hotchkiss,
by Munson & Philipp
Attys.

(Model.)
B. B. HOTCHKISS.
TORPEDO BOAT.
No. 278,708. Patented June 5, 1883.
5 Sheets—Sheet 2.
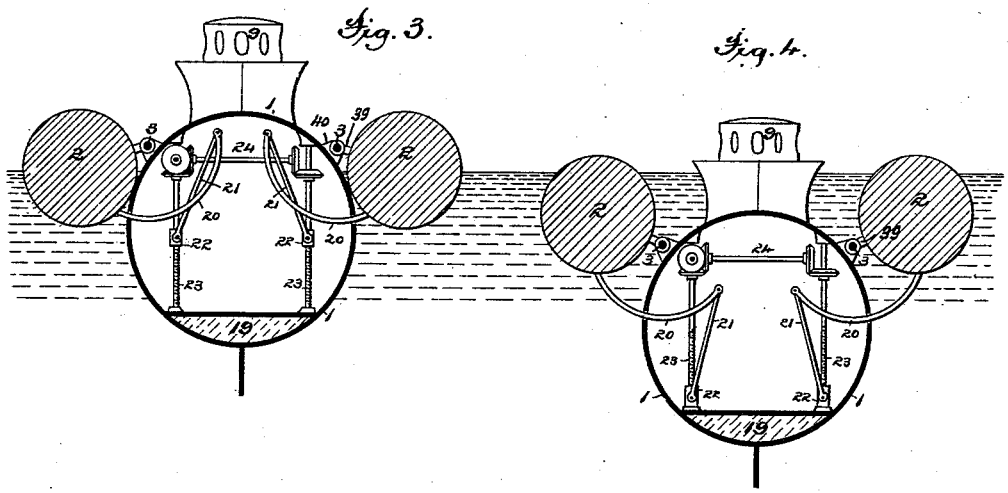
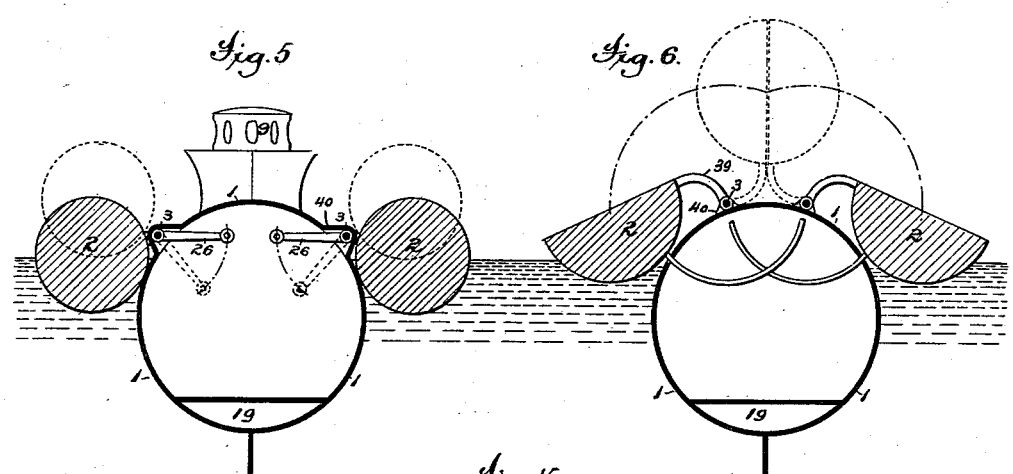
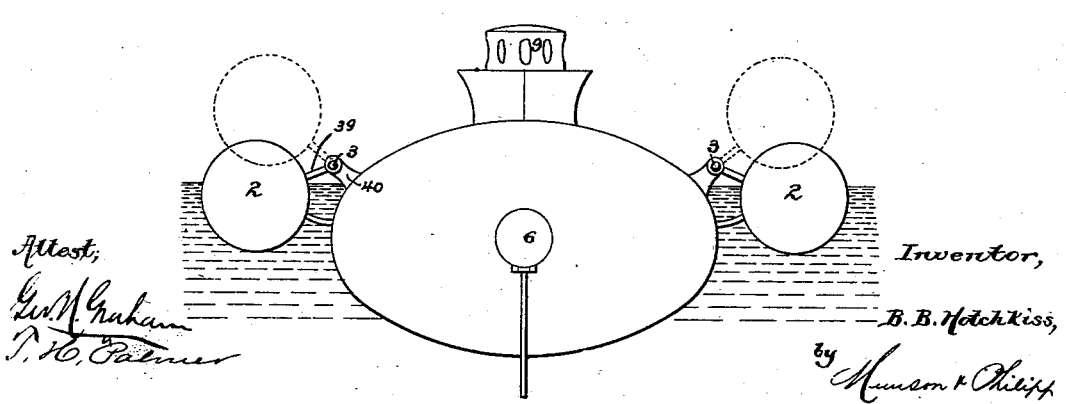
Attest:
Geo. M. Graham
T. H. Palmer
Inventor,
B. B. Hotchkiss,
by Munson & Philipp
Attys.

(Model.)
B. B. HOTCHKISS.
TORPEDO BOAT.
No. 278,708. Patented June 5, 1883.
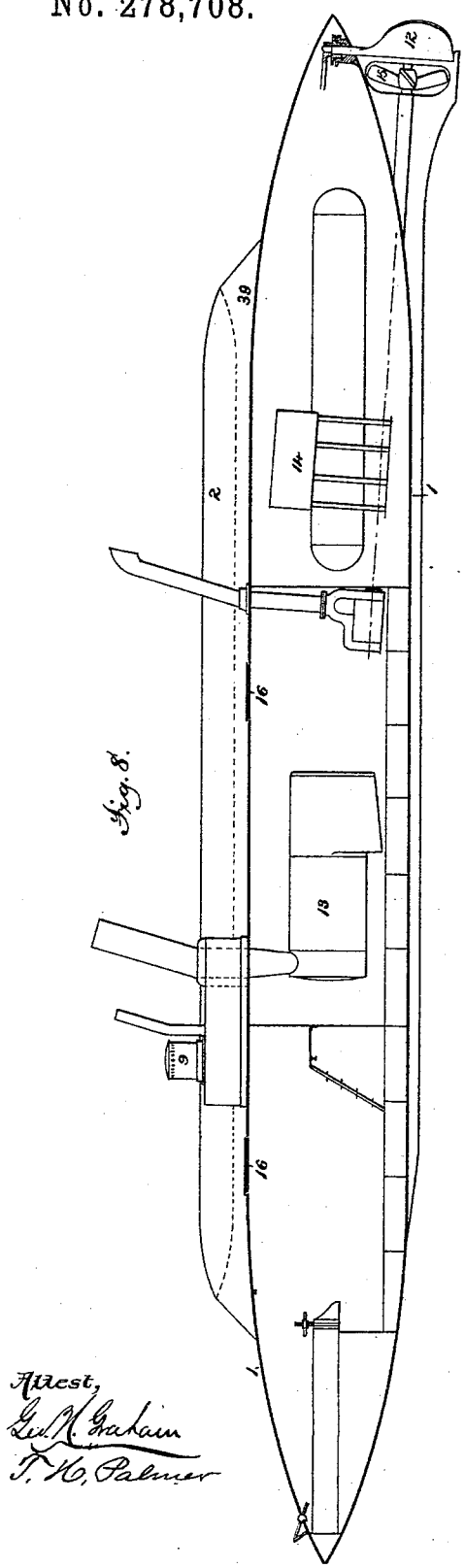
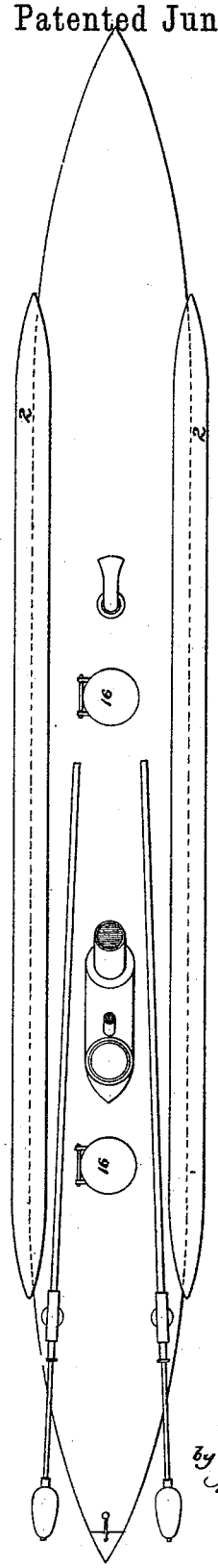

(Model.)
B. B. HOTCHKISS.
TORPEDO BOAT.
No. 278,708.  Patented June 5, 1883.
5 Sheets—Sheet 4.
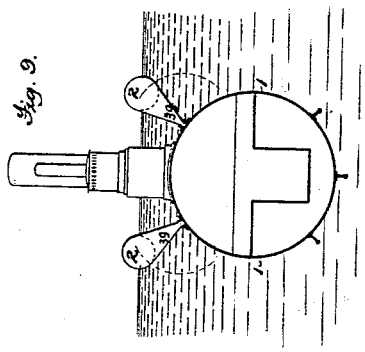
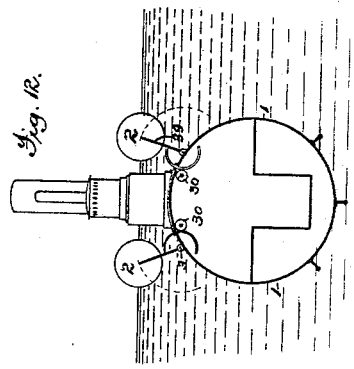
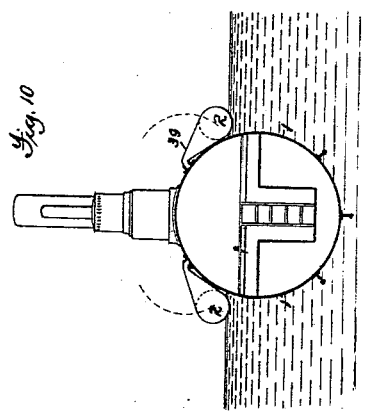
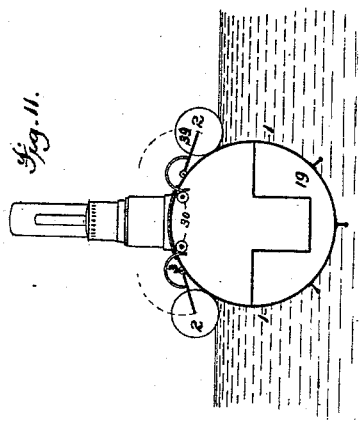
Attest,
Geo. M. Graham
T. H. Palmer
Inventor,
B. B. Hotchkiss,
by Munson & Philipp
Attys.

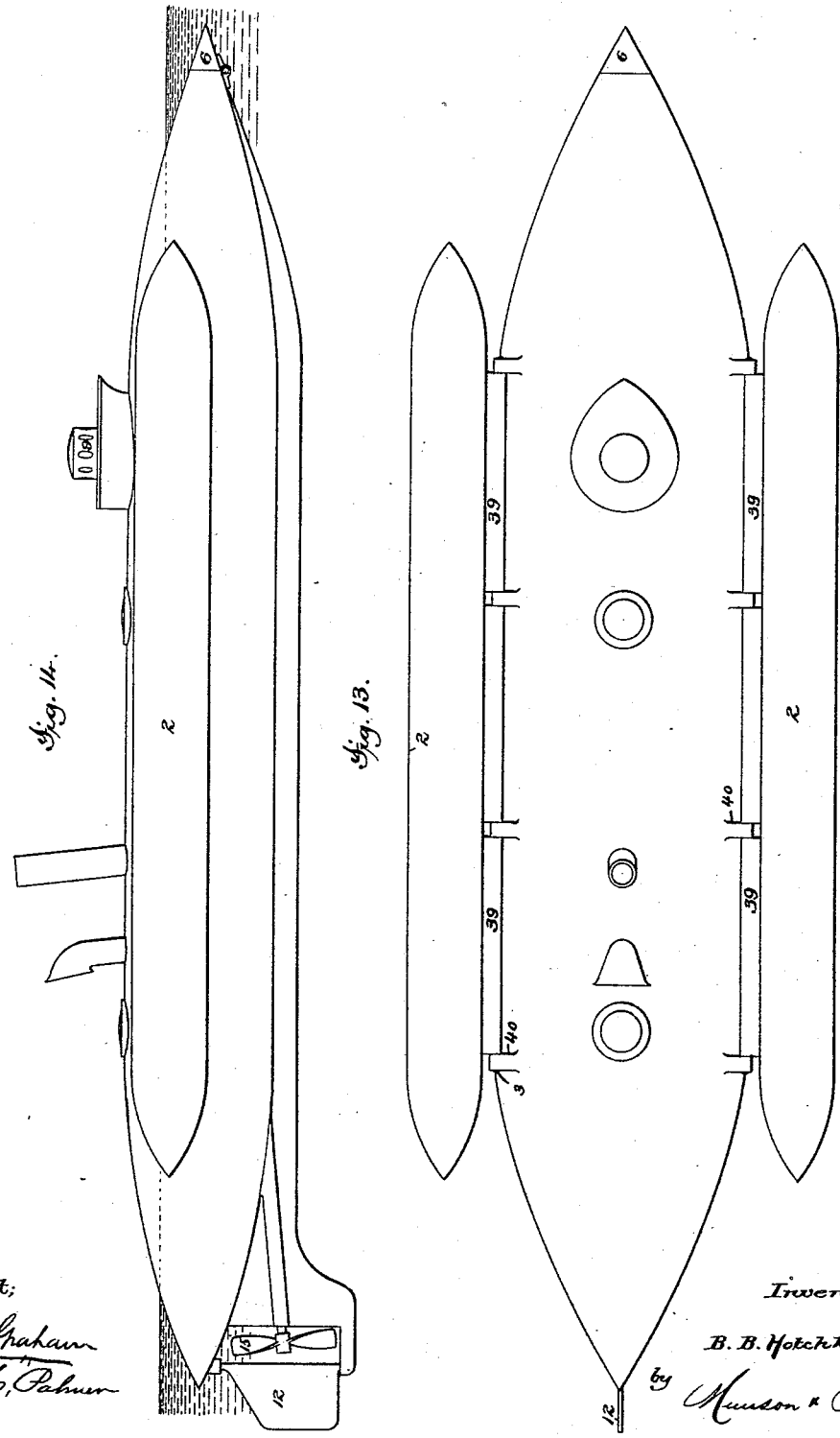

UNITED STATES PATENT OFFICE.

BENJAMIN B. HOTCHKISS, OF PARIS, FRANCE.

TORPEDO-BOAT.

SPECIFICATION forming part of Letters Patent No. 278,708, dated June 5, 1883.

Application filed December 20, 1880. (Model.) Patented in France July 30, 1880, No. 138,016; in Belgium August 3, 1880, No. 52,205; in Germany August 3, 1880, No. 12,395; in Italy August 7, 1880; in England August 9, 1880, No. 3,250; in Sweden October 2, 1880; in Austria November 5, 1880; in Spain January 5, 1881, and in Norway April 1, 1881.

*To all whom it may concern:*

Be it known that I, BENJAMIN B. HOTCHKISS, of New York, N. Y., a citizen of the United States, residing in the city of Paris, Department of the Seine, and Republic of France, have invented certain new and useful Improvements in Torpedo-Boats, fully described and represented in the following specification and the accompanying drawings, forming a part of the same.

This invention relates to that class of torpedo-boats which under ordinary circumstances float upon the surface of the water, but which may, on approaching an enemy, be so far submerged as to expose only small and unimportant parts, the hull and other parts which would receive dangerous injury by being hit being thus protected by the water against an enemy's fire.

The invention consists in providing a torpedo-boat with floats and with means of sinking and raising it, whereby it may be sustained so as to float upon the water or when mainly submerged therein.

It further embraces novel means for raising and sinking the boat and novel constructions of its floats.

In the accompanying drawings, illustrating embodiments of my improvements, Figure 1 represents a longitudinal sectional plan view of a boat constructed according to my invention. Fig. 2 represents a longitudinal sectional elevation of the same. Fig. 3 represents a cross-sectional elevation of the same on line A of Fig. 1. Fig. 4 represents a similar sectional elevation with the boat submerged. Fig. 5 represents a modification of the means for moving the floats. Fig. 6 represents a modified construction of the floats. Fig. 7 represents by a plan view, Fig. 8 by a longitudinal sectional elevation, and Figs. 9, 10, 11, 12 by cross-sectional elevations taken on the line E of Fig. 8, further modified structure of the floats. Fig. 13 represents by a plan view, Fig. 14 by a side elevation, and Fig. 15 by a bow end elevation, a modification of the hull of the boat.

The boat, whether having a cylindrical hull or one oblong or of other shape in its cross-section, constructed of iron or any other suitable material, and whether provided with one or more keels, which various constructions are all represented, is provided on opposite sides of the upper part of its hull or body with floats, as 2 2. These floats, constructed of a material of lower specific gravity than water, preferably cork, are also so constructed as to expose small surfaces to be fired at, and are so arranged that even if damaged by projectiles they may not be so far destroyed as not to retain sufficient buoyancy to prevent the main body of the boat from sinking. These floats are shown as single or continuous bodies extending parallel with the keel and throughout nearly the whole extent of the length of the boat. They may be shorter than shown, and each be divided so as to form two or more members; but the continuous structure is preferred. They may be circular in their cross-section, as shown in Figs. 1 to 5 and 11 and 12, hemispherical, as in Fig. 6, or of the peculiar shape shown in Figs. 9 and 10. They may project rigidly from the boat-body, as in Figs. 7 to 9, or be jointed thereto so as to be capable of moving to and from the boat-body, as shown in the other figures. This latter form of them may be provided with various means of connection with the boat-body, the preferable one being hinges, one knuckle of which projects from the rib arms or plate 39, which is affixed to the float, while the other knuckle, 40, projects from the side of the boat, the pintle being a rod, 3, as is shown by most of the figures; but this hinge may be a flexible joint, as is shown in Figs. 9 and 10, the same being provided by rubber or any other material of proper strength that will sustain long exposure to water. In the preferable embodiment of the invention these floats are provided with mechanism for raising and depressing them that is capable of operation from within the body of the boat. As shown in Figs. 3 and 4, this mechanism consists of curved rods 20, that are secured at one end to the body of the float, and pass through stuffing-boxes provided in the sides of the boat, the inner ends of which rods are connected by means of drawing-rods 21, with nuts 22, that travel up and down on screw-rods 23. There may be two or more sets of these mechanisms, and their simultaneous operation will be effected by means of two cross-shafts, 24, and a longitudinal shaft, 27, that are geared together and turned by means of a hand-wheel, 25. Any other mode of operating the curved rods 20 may, however, be adopted. These curved rods may be dispensed with, and simple arms, as 26, used, as in Fig. 5. In this construction the shaft 3, constituting the pintle of the hinge, is made fast to the knuckle that is connected to the floats, and these arms 26 are secured to said shaft, so as to act as rock-arms capable of hand operation or mechanical movement, as may be desired. In this form the shaft will be housed and the knuckle attached to the float consist of arms, suitable packing-boxes being used to keep out the water when the boat is submerged. In the form shown in Fig. 6 the curved rods are not provided with any actuating mechanisms, and are thus shown to indicate that they may be hand-operated. In Figs. 11 and 12 these curved rods are shown as having guiding-pulleys, 30, for them to run in, whereby their movements may be steadily made when the boat is in great motion, induced either by the condition of the sea or by its propulsion. When the floats are depressed, as is shown in Figs. 3, 5, 6, 10, 11, the boat floats upon the surface of the water in the ordinary way, except that these floats so extend its body as to give it increased breadth of beam, and thus impart great stability to it, preventing its rolling and becoming upset; and when these floats are turned upward the main parts of the boat may be sunk below the surface, so that all of its essential parts are protected against the enemy's projectiles.

To accomplish the sinking and raising of the body of the boat, it is provided with one or more chambers, as 19, preferably at the bottom of the central part of the boat, provided with induction valves or gates, whereby the water may be allowed to enter them when it is desired to sink the boat below the surface, and with an eduction pipe or pipes and means for expelling the water from them to reduce the specific gravity of the boat, and thus cause the boat to rise and aid the descent of the floats. In its submerged condition it will be readily apparent that but comparatively small objects will be presented above the surface, as the upper portions of the floats, the pilot-house, smoke-stack, steam-pipe, and air-funnels, all of which are either protected from destruction by armor or by their size, as most of which, if hit and injured, would not cause the destructive effect upon the boat which a shot in the hull would accomplish, which is provided against by its submersion.

The boat is provided with steering apparatus governed from a pilot-house, 9, that is protected by armor, with a propeller, 15, boiler 13, engine 14, and their accessories, and with chambers 17 and 18 at bow and stern, in which compressed air may be stored, and from which the atmosphere within the boat may be renewed, if necessary, when it is submerged, or from which the necessary draft may be given to the boiler-fires.

By rigidly-attached floats of the peculiar form shown in Fig. 9 the lowering and raising of the boat is effected by simply letting the water into or expelling it from the chamber 19. These fixed floats by their peculiar form and angular position act to extend the bearing-surface of the body of the boat laterally, and thus not only add to its general buoyancy, but increase its breadth of beam, and thus give it great stability. A boat provided with these floats may be used as a deck-boat by removing the man-hole covers 16, which will of course be closed when the boat is to be submerged.

Any form of topedo may be used—such, for instance, as the fish-torpedo represented in Figs. 1 and 2, where one torpedo, 4, is represented as ready for service, the same being housed in a discharge-pipe, 5, in the bow of the boat, which pipe will be closed, as is common, by devices 6 and 7, controllable from the inside of the boat, to permit its egress from the chamber and prevent the ingress of water into the boat.

A second or reserve torpedo, 8, is shown as housed in a holding-chamber near the bottom of the boat.

The boat may be rigged for spar-torpedoes, as is shown in Fig. 7, in addition to the fish-torpedoes, if desired.

With reference to the elliptical form of hull, it may be said that it provides a perfectly symmetrical body with respect to the horizontal central plane, whereby the boat is caused to readily obey the rudder.

What is claimed is—

1. An inclosed submergeable torpedo-boat, provided on opposite sides with longitudinally-arranged floats of cork or similar buoyant material, and with means for submerging it, substantially as described.

2. An inclosed torpedo-boat, provided with means for submerging it and at each side with longitudinally-arranged swinging floats, substantially as described.

3. An inclosed torpedo-boat, provided with movable floats of cork or similar buoyant material, and with means for raising and lowering the same from the interior of the boat, substantially as described.

In testimony whereof I have hereunto set my hand in the presence of two subscribing witnesses.

B. B. HOTCHKISS.

Witnesses:
P. H. PALMER,
GEO. H. GRAHAM.